United States Patent [19]
Behrens

[11] 3,797,807
[45] Mar. 19, 1974

[54] MATERIAL MIXER

[75] Inventor: Norman A. Behrens, Columbus, Nebr.

[73] Assignee: Creston Manufacturing Co., Inc., Creston, Nebr.

[22] Filed: Sept. 13, 1971

[21] Appl. No.: 179,795

[52] U.S. Cl. ........................................ 259/41, 259/6
[51] Int. Cl. ............................ B01f 7/04, B01f 7/08
[58] Field of Search .............. 259/6, 21, 41, 104, 97

[56] References Cited
UNITED STATES PATENTS

| 2,576,177 | 11/1951 | Herr ..................................... | 259/6 |
| 3,482,821 | 12/1969 | Blackwood ........................... | 259/6 |
| 3,421,740 | 1/1969 | Behrens .............................. | 259/6 X |
| 3,129,927 | 4/1964 | Mast ................................... | 259/6 |

*Primary Examiner*—Harvey C. Hornsby
*Assistant Examiner*—Philip R. Coe
*Attorney, Agent, or Firm*—Zarley, McKee & Thomte

[57] ABSTRACT

A mixing and dispensing wagon having side-by-side lower longitudinal augers moving material away from the end walls and a pair of upper longitudinal augers moving material toward the end walls such that the material is recirculated for mixing away from the ends on the bottom, upwardly and toward the ends at the top, then downwardly and back to the center area. A discharge conveyer is in communication with the material chamber near the lateral center of the chamber on a level with the lower augers. The upper augers have paddles at the ends adjacent the end walls thereby preventing compacting of the material against the end walls and also to force the material downwardly. One lower conveyer includes conveyer portions spaced apart at its inner ends by a plurality of paddles.

5 Claims, 6 Drawing Figures

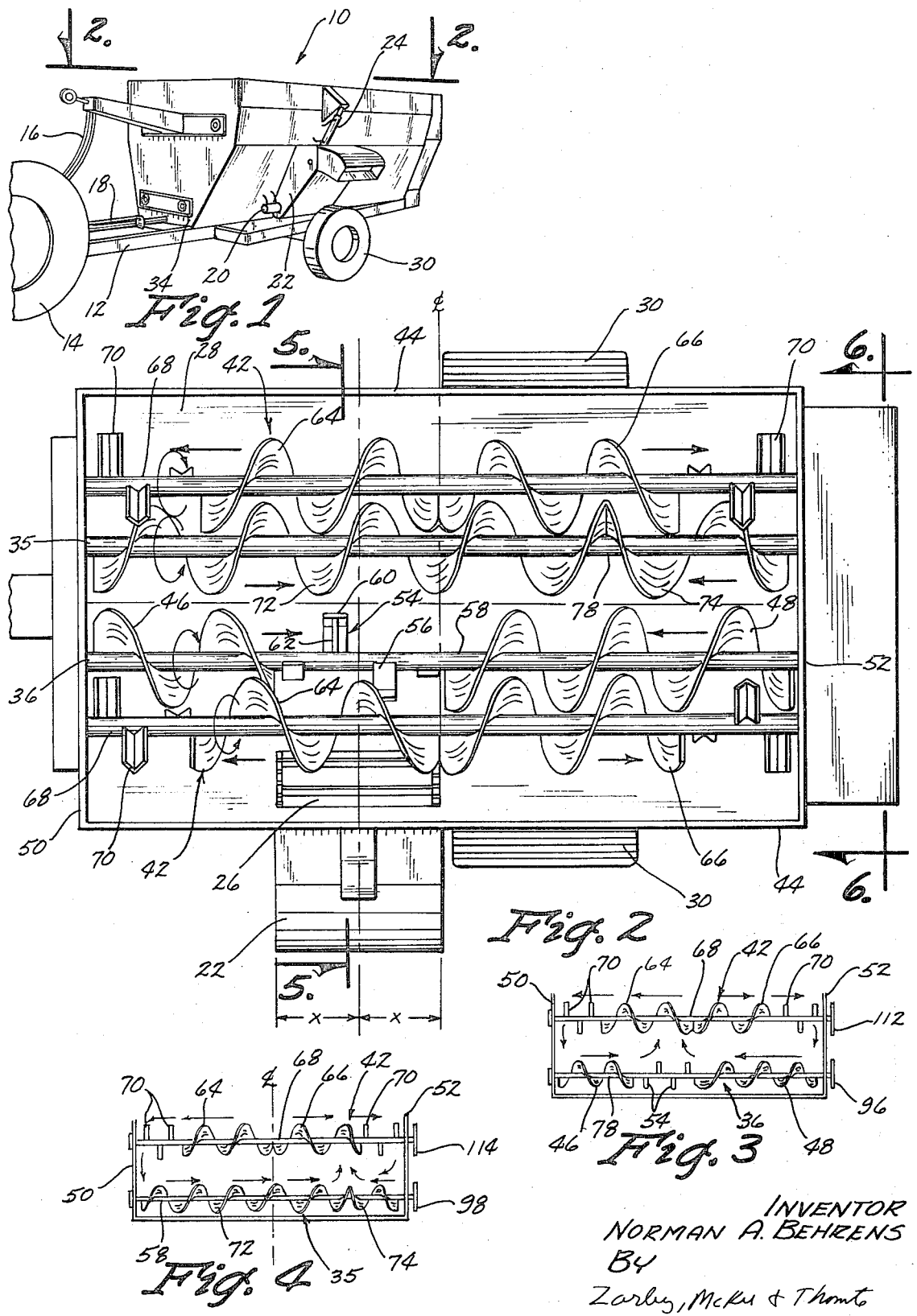

INVENTOR
NORMAN A. BEHRENS
BY
Zarley, McKee & Thomt
ATTORNEYS

MATERIAL MIXER

It is the objective of the material mixer and dispenser of this invention to maximize the mixing with a minimum of power and to also provide the fastest possible unloading of the mixer. This is accomplished by moving the material in the wagon to the center area for unloading since the material then only has to move half the length of the wagon rather than the full length as would be the case if the unloading means were located at one end. The material which is not being unloaded is being constantly recirculated longitudinally inwardly on the lower level where it then boils upwardly to move outwardly and then back down at the ends of the chamber to be moved back toward the center area. Each time the material is in the general area of the unloading conveyer.

It is also seen that the forces involved in the four conveyers are balanced since they are substantially equal and opposite. The two lower augers each have portions extending in opposite directions just as the two top augers have portions extending in opposite directions. Accordingly, the wear and tear on the bearings for the augers is minimized.

The discharge rate for the unloading conveyer is nearly unlimited due to its location where it is being fed by the lower augers drawing material in from opposite ends of the wagon. It has been found that the wagon may be moved at speeds up to ten miles an hour while unloading into a trough or the like.

The mixing chamber is comparatively wide at its base thereby making the height of the chamber less resulting in less weight on the augers. The upper augers do not compact the material at the end walls due to the fact that paddles are provided on each of them adjacent the end walls. The material is maintained in a granular state whereby it may be readily moved downwardly for communication with the lower augers to be moved to the center and then boiled upwardly. The paddles on the lower augers in the center area also serve to move the material onto the discharge conveyer.

A hydraulically operated gate opens and closes the chamber to communication with the unloading conveyer which is driven by a hydraulic motor.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the material mixing wagon;

FIG. 2 is a cross sectional view taken along line 2 — 2 in FIG. 1;

FIG. 3 is an elevation schematic of top and bottom left-hand augers;

FIG. 4 is a schematic elevational view of top and bottom righthand augers;

Figure 5:
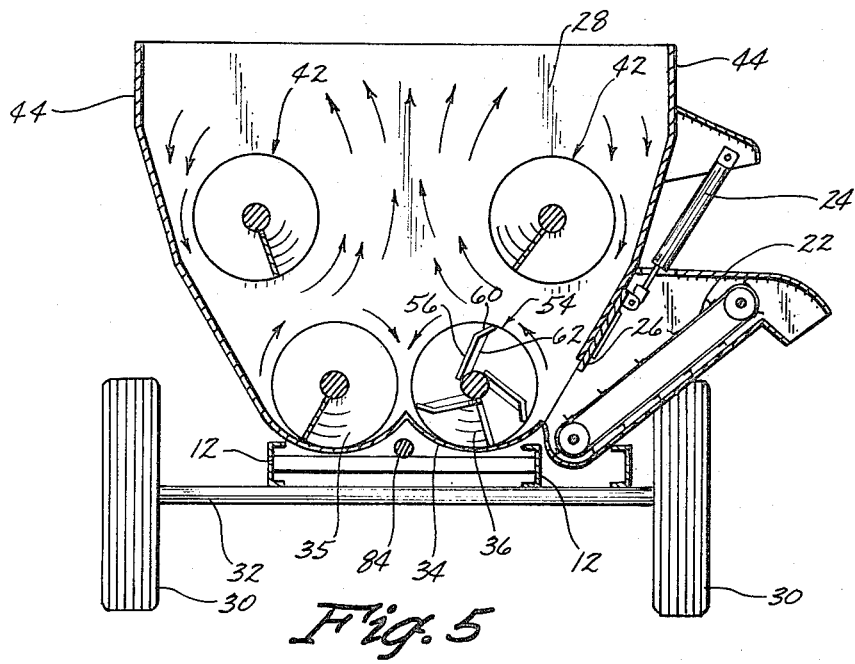
FIG. 5 is a cross sectional view taken along line 5 — 5 of FIG. 2.
Figure 6:
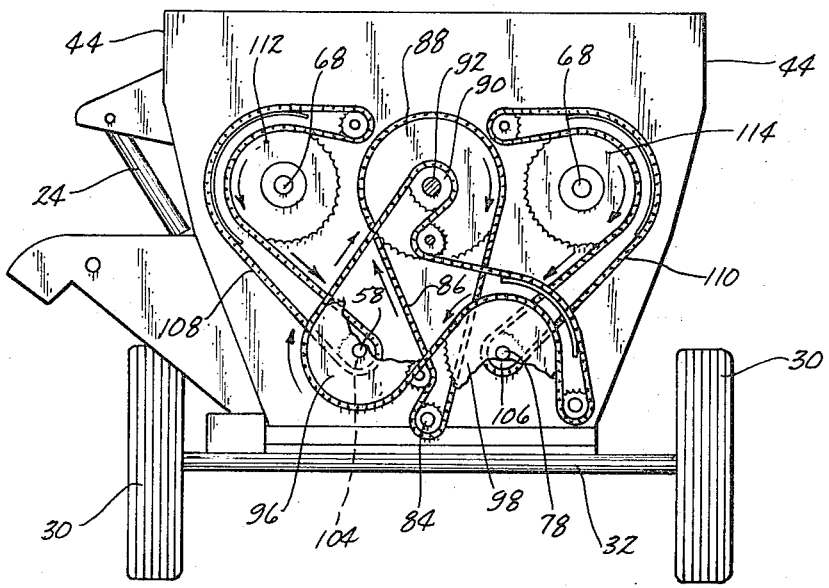
FIG. 6 is a cross sectional view taken along line 6 — 6 of FIG. 2.

The mixing wagon of this invention is referred to generally in FIG. 1 by the reference numeral 10 and is shown connected by a tongue 12 to a tractor 14 which supplies hydraulic power through hydraulic lines 16 and p.t.o. power through shaft 18. The hydraulic power drives a hydraulic motor 20 which powers an unloading conveyer 22. The hydraulic power also operates a hydraulic cylinder 24 for operating a closable gate 26 which places the interior of the chamber 28 in communication with the unloading conveyer 22. A pair of support wheels 30 carry the wagon box on an axle 32.

The wagon box has a bottom wall 34 which includes upwardly facing concave surfaces 46 to conform generally to the shape of lower auger conveyers 35 and 36 in side-by-side relationship. The opposite side walls 38 of the wagon flare outwardly and upwardly and include upper side wall portions 40 outwardly of upper conveyer augers 42. These side wall portions 40 terminate in vertical side wall portions 44 at the top of the wagon. The unloading conveyer 22 has its rear side, as seen in FIG. 2, on the transverse centerline of the wagon just forwardly of the ground support wheels 30 and is regarded as being substantially in the center area of the wagon.

The lower auger conveyer 36 includes front and rear conveyer portions 46 and 48, respectively, for moving material from the opposite end walls 50 and 52 longitudinally inwardly to an area adjacent the unloading conveyer 26. The inner ends of the auger portions 46 and 48 are spaced apart and four paddles 54 are provided on the conveyer for boiling the material upwardly and onto the unloading conveyer 26 if it is being used. The paddles 54 include a flat portion 56 welded at one end to the peripheral side wall of the tubular shaft 58 of the conveyer 36. An outer flat portion 60 is provided on the first flat portion 56 and is angled towards the shaft 58. A reinforcing rib 62 interconnects the two portions 56 and 60. It is thus seen that the paddles tend to throw the material towards the unloading conveyer 26 as well as upwardly for communication with the upper auger conveyers 42.

The upper conveyer 42 over the conveyer 36 includes auger portions 64 and 66 extending from the transverse centerline towards the front and rear end walls 50 and 52, respectively. Each of the conveyer portions 64 and 66 terminate short of these end walls and the auger shaft 68 includes three paddles 70 at each end thereof. The paddles 70 are V-shaped in cross section and extend perpendicular to the shaft 68.

The second lower auger conveyer 35 has a pair of opposing auger portions 72 and 74 extending the full length of the wagon. The opposing inner ends of the auger portions function to cause the material to be boiled upwardly for communication with the upper conveyers 42. The auger conveyer portion 72 is longer than the auger conveyer portion 74 and thus extends rearwardly beyond the transverse centerline, as seen in FIG. 2.

The conveyer 42 above the conveyer 35 is similar to the conveyer 42 above the conveyer 36 and includes frontwardly extending conveyer portions 64 and rearwardly extending conveyer portions 66. Each of these conveyer portions terminate adjacent the front and rear end walls and V-shaped paddles 70 are provided on the conveyer shaft 68.

The power drive machinery is shown in FIG. 5 wherein the power take-off is connected to a shaft 84 which drives a chain 86 connected to a drive sprocket 88. A smaller drive sprocket 90 is carried on a common shaft 92 with the drive sprocket 88 and drives a drive chain 94 which drives lower sprocket wheels 96 and 98 carried on shafts 100 and 102 which also includes smaller sprocket wheels 104 and 106, respectively, coupled by drive chains 108, 110 passing around upper drive sprockets 112, 114 on the auger shafts 68. The shaft 84 extends the length of the wagon box, as seen in FIG. 4, underneath the bottom wall portion 34.

In operation it is seen that the wagon chamber 28 is filled with feed or the like and supplements for mixing and unloading purposes. Prior to unloading, a certain amount of mixing is accomplished by operation of the augers. The circulation and recirculation of the grain will be in accordance with the arrows as indicated in FIGS. 3, 4 and 5. In FIG. 3 it is seen that the lower conveyer 36 is shown with the conveyer 42 immediately above it. The inwardly moving conveyer portions 46 and 48 cause the grain to move inwardly along the bottom to where it is boiled upwardly by the paddles 54 and is then moved longitudinally toward the front and rear walls 50 and 52 by the upper auger conveyer portions 64 and 66. Paddles 70 are provided between the end walls 50 and 52 and the conveyer portions 64 and 66 such that the material is not compacted but remains loose to flow downwardly to be moved longitudinally inwardly again by the lower conveyer portions 46 and 48. In FIG. 4 we see that the lower conveyer portion 72 moves the grain away from the front wall 50 and the conveyer portion 74 moves the grain away from the rear wall 52 where the grain from each of these conveyer portions meets and is boiled upwardly to be moved longitudinally outwardly by the front and rear upper conveyer portions 64 and 66. The paddles 70 at the outer ends of the upper conveyer 42 perform the same function as the paddles on the other upper conveyer and prevent the compacting of the material against the end walls 50 and 52 and also serve to force the grain downwardly to the lower conveyer portions for moving again longitudinally inwardly.

Upon operation of the unloading conveyer 22 with the gate 26 open the material will be fed onto the conveyer by the paddles 54 of the conveyer 36. It is appreciated that the unloading conveyer can more readily be maintained in a full condition since it is feeding from the center of the wagon and thereby causing the grain to move only half the distance it would have to move if it were at the front or rear ends of the wagon.

I claim:

1. A material mixer, comprising,
   an elongated container having a mixing chamber.
   an unloading means positioned forwardly of the transverse center of said chamber and in communication with said chamber adjacent its bottom,
   a first conveyor adjacent the bottom of said chamber and having oppositely extending conveyor portions which meet at their inner ends on the transverse center line of said unloading means forwardly of the transverse center line of said chamber for moving material towards said unloading means from opposite ends of said chamber,
   a second conveyor positioned in said chamber above said first conveyor and having oppositely extending portions which meet at the transverse center line of said chamber for moving material in opposite directions away from the transverse center of said chamber,
   a third conveyor positioned inside-by-side relationship to said first conveyor adjacent the bottom of said chamber and having oppositely extending conveyor portions which meet at their inner ends rearwardly of the transverse center line of said chamber for moving material towards a transverse plane in said chamber positioned rearwardly of the transverse center line, and
   a fourth conveyor positioned in said chamber above said third conveyor and having oppositely extending portions which meet at the transverse center line of said chamber for moving material in opposite directions away from the transverse center of said chamber.

2. The structure of claim 1 wherein said conveyer portions of said first conveyer are spaced apart at their adjacent ends.

3. The structure of claim 2 wherein said conveyer portions of said first conveyer are aguers and paddles are provided on said first conveyer in said space between said adjacent conveyer portions.

4. The structure of claim 1 wherein said portions of said second conveyer terminate in spaced relationship to the adjacent end walls of said chamber.

5. The structure of claim 4 wherein said portions of said second and fourth conveyors are augers and paddles are provided on said second and fourth conveyers between the outer ends of said portions of said second and fourth conveyors and said end walls.

* * * * *